US010515475B2

(12) United States Patent
Felt (10) Patent No.: US 10,515,475 B2
(45) Date of Patent: Dec. 24, 2019

(54) IMPLEMENTING LAYERED NAVIGATION USING INTERFACE LAYERS

(71) Applicant: Verizon Patent and Licensing Inc., Arlington, VA (US)

(72) Inventor: Michelle Felt, Randolph, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 504 days.

(21) Appl. No.: 15/178,308

(22) Filed: Jun. 9, 2016

(65) Prior Publication Data

US 2017/0357386 A1 Dec. 14, 2017

(51) Int. Cl.
*G09G 5/377* (2006.01)
*G06T 13/80* (2011.01)

(52) U.S. Cl.
CPC .................... *G06T 13/80* (2013.01)

(58) Field of Classification Search
CPC ............... G06F 3/0482; G06F 3/04842; G06F 3/04845; G06F 2203/04804; G06F 3/0483; G06F 3/0488; G06T 13/80; G06T 15/503; G09G 5/377
See application file for complete search history.

(56) References Cited

U.S. PATENT DOCUMENTS

| 6,016,144 A * | 1/2000 | Blonstein ........... H04N 5/44543 348/553 |
| 2009/0061837 A1* | 3/2009 | Chaudhri .............. G06F 3/0481 455/418 |
| 2014/0289650 A1* | 9/2014 | Cotlarciuc ............ G06F 3/0481 715/760 |
| 2014/0351728 A1* | 11/2014 | Seo .................... H04M 1/72569 715/766 |
| 2016/0216874 A1* | 7/2016 | Bayston ................ G06F 3/0481 |

OTHER PUBLICATIONS

Wikipedia, "2D Computer Graphics," https://en.wikipedia.org/wiki/2D_computer_graphics, Feb. 27, 2016, 9 pages.
Wikipedia, "User Interface," https://en.wikipedia.org/wiki/User_interface, Jun. 9, 2016, 10 pages.

* cited by examiner

*Primary Examiner* — Jennifer N To
*Assistant Examiner* — Amy P Hoang (57) ABSTRACT

A device may provide multiple interface layers for display in a layered manner. The multiple interface layers may be associated with a single application. The multiple interface layers may be layered such that at least one interface layer, of the multiple interface layers, at least partially obscures at least one other interface layer of the multiple interface layers. The device may display, via a display of the device, the multiple interface layers in a manner that permits user interactions with more than one interface layer of the multiple interface layers. The device may detect a user interaction with an interface layer of the multiple interface layers displayed via the display. The device may adjust the manner in which the multiple interface layers are displayed based on the user interaction.

20 Claims, 10 Drawing Sheets

User Device

IMPLEMENTING LAYERED NAVIGATION USING INTERFACE LAYERS

BACKGROUND

A display of a user device may display a user interface (e.g., a graphical user interface). A user interface may permit interactions between a user of the user device and the user device. In some cases, the user may interact with the user interface to operate and/or control the user device to produce a desired result. For example, the user may interact with the user interface of the user device to cause the user device to perform an action. Additionally, the user interface may provide information to the user.

DETAILED DESCRIPTION OF PREFERRED EMBODIMENTS

The following detailed description of example implementations refers to the accompanying drawings. The same reference numbers in different drawings may identify the same or similar elements.

A user device may provide a user interface or a screen, such as a screen that includes a user interface and/or user interface elements, for display (e.g., via a display of the user device). When a user navigates from a first user interface to a second user interface, the device may cease providing the first user interface for display and may provide the second user interface for display in place of the first user interface. In other words, the user device may provide one user interface for display at a time. By providing user interfaces for display in this manner, the user device may implement linear navigation between user interfaces associated with the user device. For example, linear navigation may include horizontal navigation between screens in an x or y direction. When implementing linear navigation, the user device may display buttons, such as a back button and/or a forward button, to permit the user to navigate forward or backward between user interfaces.

Implementations described herein enable a user device to simultaneously provide user interfaces or user interface elements for display in a layered manner (e.g., by partially or completely superimposing or overlaying interface layers) in a single screen. This enables the user device to implement layered navigation between the interface layers where, for example, a user navigates vertically in a z direction between the interface layers. By implementing layered navigation, the user device may permit interaction with multiple interface layers without switching screens via the use of transformational user interfaces and/or user interface elements to collapse and/or expand the multiple interface layers. In this way, implementing layered navigation conserves computing resources, such as memory resources, processing power, and/or battery consumption, that would otherwise be used to navigate between screens in a linear manner (e.g., using a back button and/or a forward button to navigate) by reducing the quantity of screens the user device would have to provide for display. Further, implementing layered navigation improves a user experience by reducing a quantity of screens that a user has to navigate to reach a desired user interface.

Figure 1:
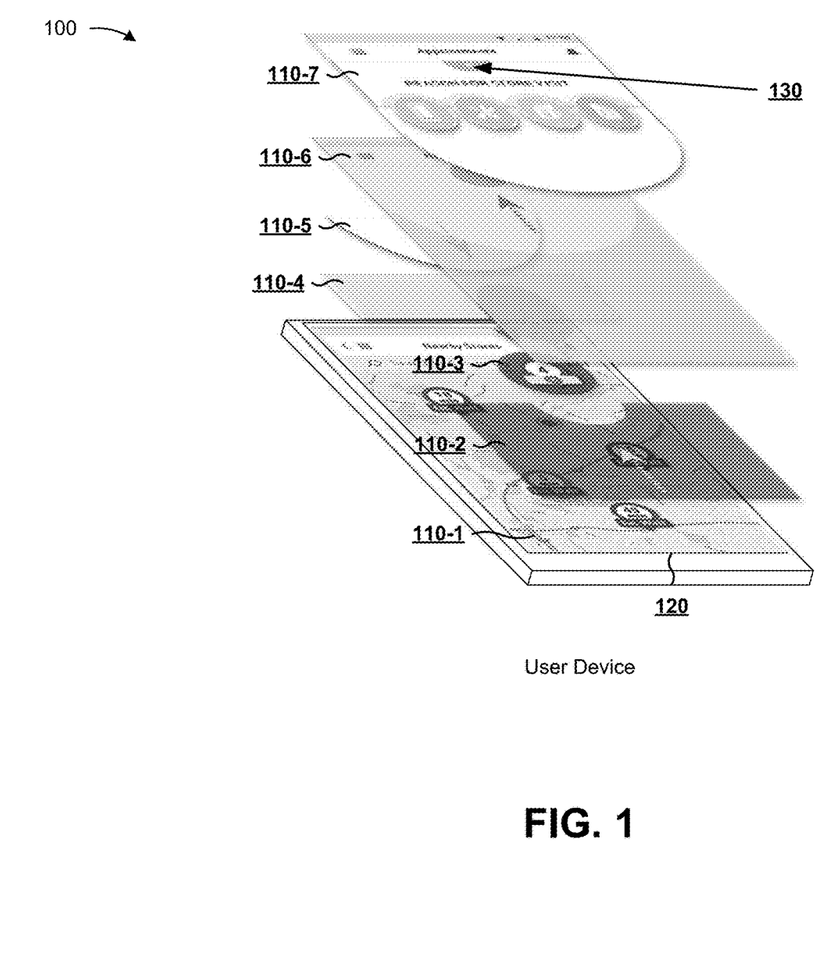
FIG. 1 is a diagram of an overview of an example implementation described herein.

FIG. 1 is a diagram of an overview of an example implementation 100 described herein. As shown in FIG. 1, a user device may provide multiple interface layers 110-1 through 110-7 for display via a single screen. As further shown in FIG. 1, display 120 may display multiple interface layers simultaneously. For example, display 120 may simultaneously display interface layers 110-6 and 110-7, where interface layer 110-7 partially obscures interface layer 110-6 and interface layer 110-6 at least partially obscures interface layers 110-1 through 110-5. Despite interface layer 110-7 partially obscuring interface layer 110-6, a user may interact with either interface layer 110-6 or 110-7, thereby enabling the user to interact with multiple interface layers, via a single screen, in a z direction. This conserves computing resources by reducing or eliminating the need for the user device to use computing resources to switch screens to display the multiple interface layers.

Further, as shown in FIG. 1, by reference number 130, a user may interact with interface layer 110-7 by interacting with a close button, close control, or toggle control of interface layer 110-7. Interacting with the close button may cause the user device to adjust the manner in which the interface layers are displayed by, for example, causing display 120 to display interface layer 110-1 (e.g., rather than displaying interface layers 110-6 and 110-7).

In this way, a user device enables a user to interact with different interface layers without having to access the different interface layers in a linear manner. This conserves computing resources, in the form of memory resources, processing power, and/or battery consumption, by reducing or eliminating the need for the user device to provide a sequence of screens to provide different user interfaces for display. Further, this improves a user experience by reducing the quantity of screens that a user has to navigate to reach a desired user interface.

As indicated above, FIG. 1 is provided merely as an example. Other examples are possible and may include additional or fewer layers in different configurations, shapes, and sizes and may differ from what was described with regard to FIG. 1.

Figure 2:
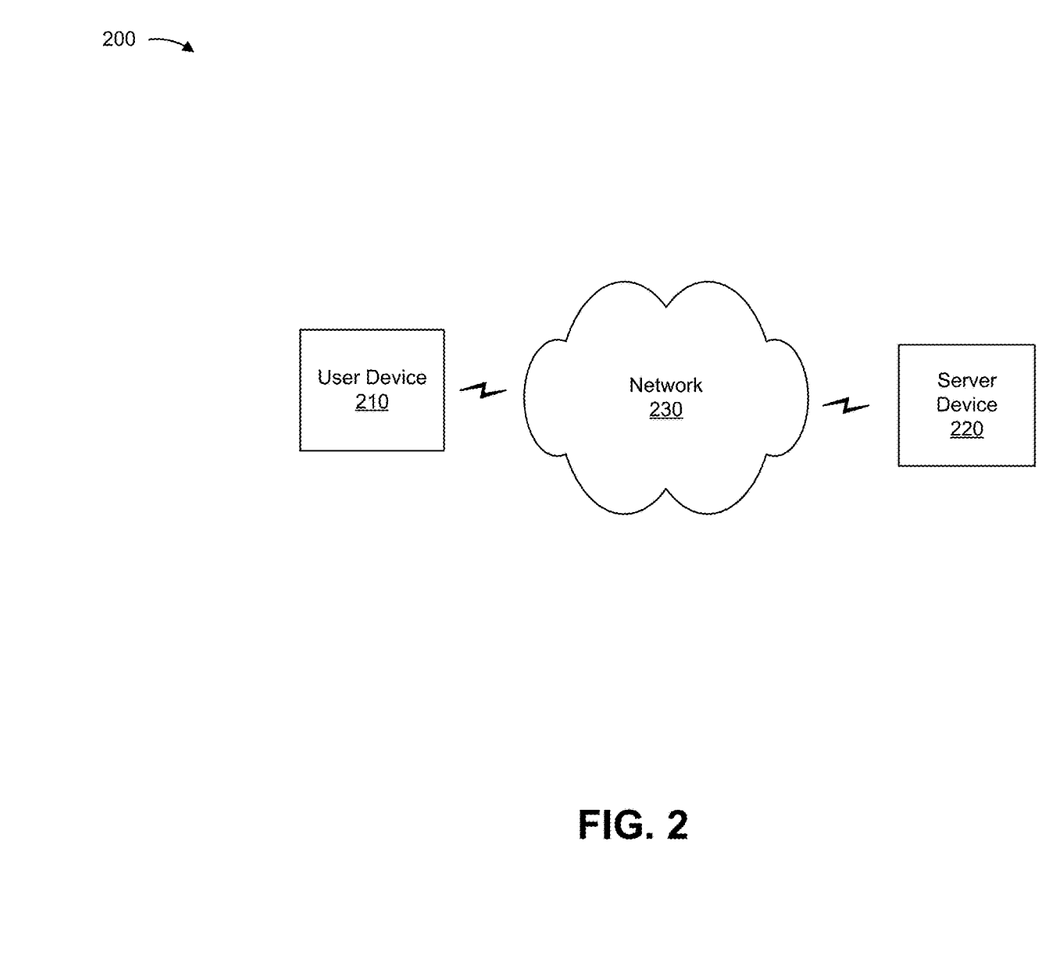
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a server device 220, and a network 230. Devices of environment 200 may interconnect via wired connections, wireless connections, or a combination of wired and wireless connections.

User device 210 includes one or more devices capable of providing multiple interface layers for display (e.g., via a display of user device 210). For example, user device 210 may include a communication and/or computing device, such as a wearable communication device (e.g., a smart wristwatch, an activity band, or a pair of smart eyeglasses), a mobile phone (e.g., a smart phone or a radiotelephone), a laptop computer, a tablet computer, a handheld computer, a gaming device, or a similar type of device. In some implementations, user device 210 may detect a user interaction with an interface layer of the multiple interface layers provided for display, as described elsewhere herein. Additionally, or alternatively, user device 210 may adjust the manner in which the multiple interface layers are displayed based on the user interaction, as described elsewhere herein.

Server device 220 includes one or more devices capable of providing multiple interface layers for display (e.g., via a display of user device 210). In some implementations, server device 220 may include a communication interface that allows server device 220 to receive information from and/or transmit information to other devices in environment 200. For example, server device 220 may receive, from user device 210, information associated with a user interaction with an interface layer of the multiple interface layers, as described elsewhere herein. As another example, server device 220 may provide, to user device 210, information associated with adjusting the manner in which the multiple interface layers are to be displayed, as described elsewhere herein.

Network 230 includes one or more wired and/or wireless networks. For example, network 230 may include a cellular network (e.g., a long-term evolution (LTE) network, a 3G network, or a code division multiple access (CDMA) network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
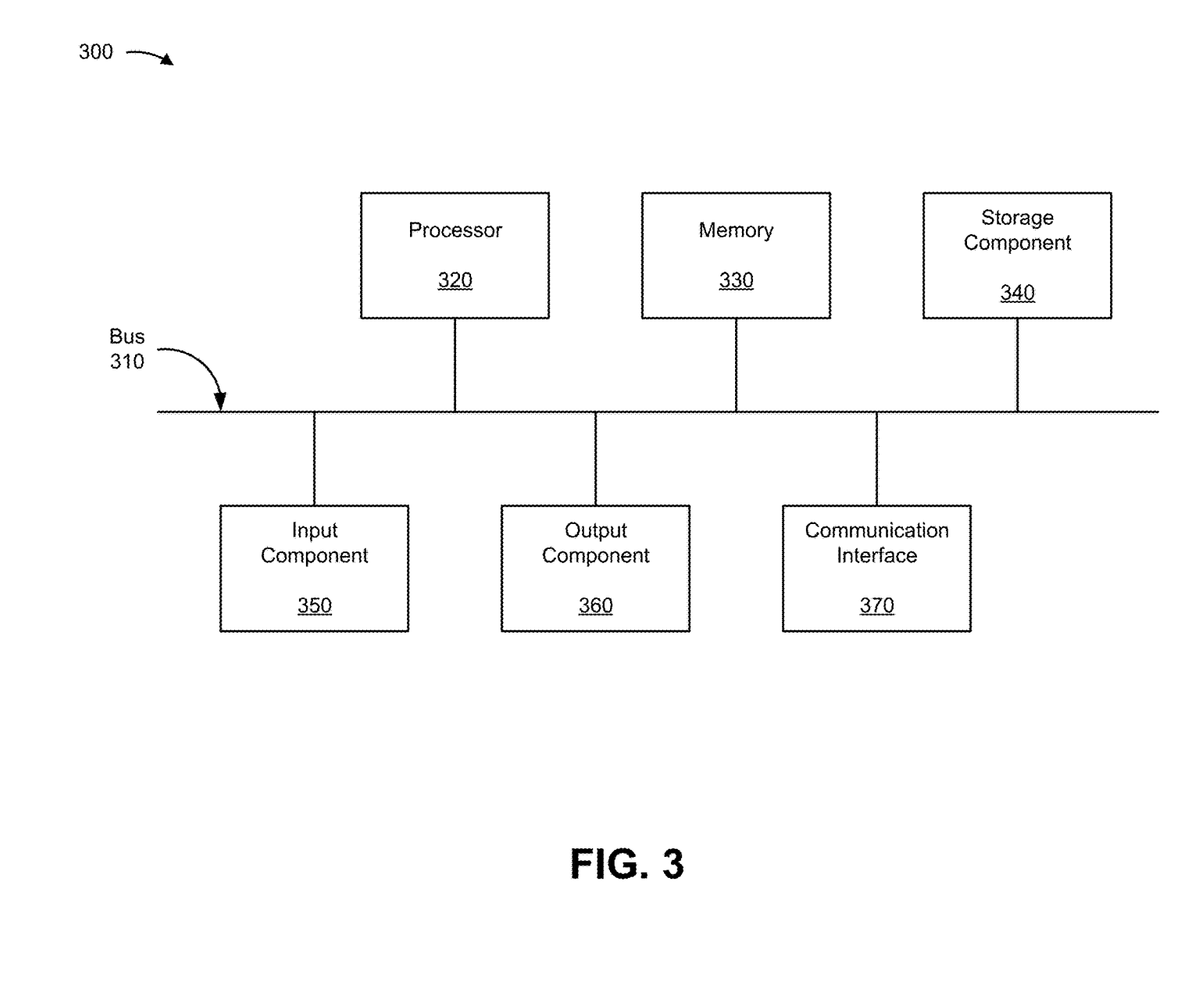
FIG. 3 is a diagram of example components of one or more devices of FIG. 2.

FIG. 3 is a diagram of example components of a device 300. Device 300 may correspond to user device 210 and/or server device 220. In some implementations, user device 210 and/or server device 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
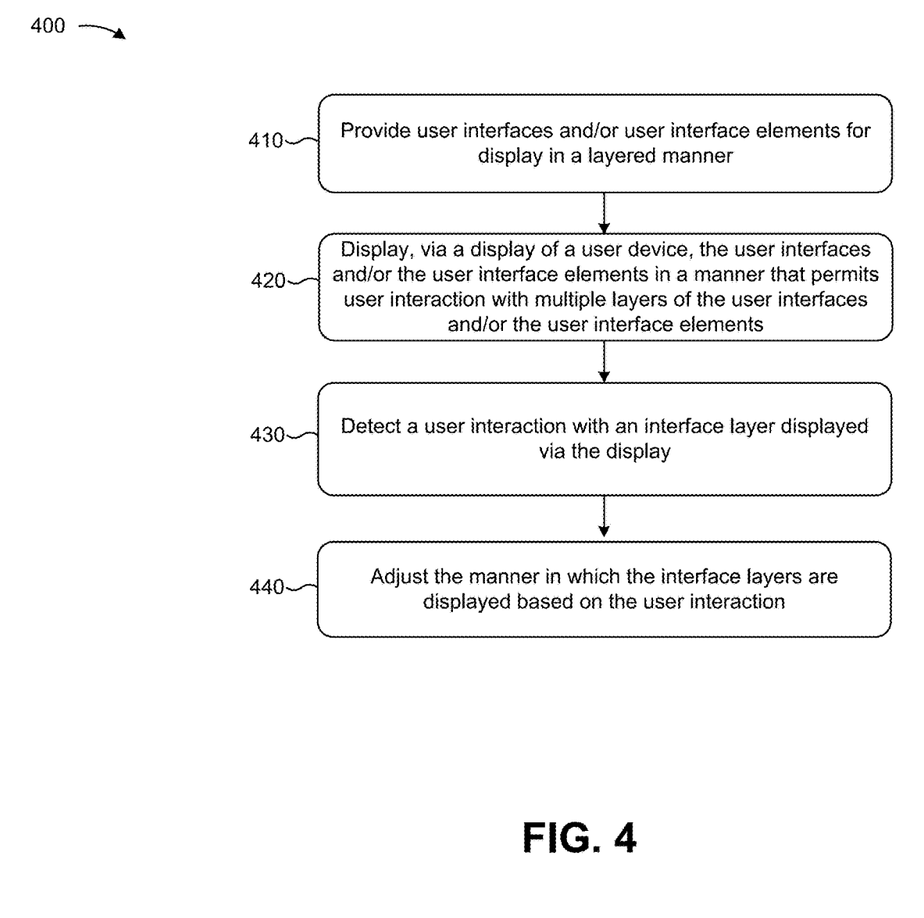
FIG. 4 is a flow chart of an example process for implementing layered navigation using interface layers.

FIG. 4 is a flow chart of an example process 400 for implementing layered navigation using interface layers. In some implementations, one or more process blocks of FIG. 4 may be performed by user device 210. In some implementations, one or more process blocks of FIG. 4 may be performed by another device or a group of devices separate from or including user device 210, such as server device 220.

As shown in FIG. 4, process 400 may include providing user interfaces and/or user interface elements for display in a layered manner (block 410). For example, user device 210 may simultaneously provide multiple user interfaces and/or multiple user interface elements, such as icons or buttons, for display using a single screen (e.g., via a display of user device 210). In some implementations, when providing the multiple user interfaces and/or the multiple user interface elements for display, user device 210 may organize the multiple user interfaces and/or the multiple user interface elements in a layered manner to form interface layers. For example, user device 210 may organize the multiple user interfaces and/or the multiple user interface elements in a vertical direction (e.g., in a z direction) where the multiple user interfaces and/or the multiple user interface elements are superimposed or overlaid.

In some implementations, an interface layer may include one or more user interfaces and/or one or more user interface elements. For example, a first interface layer may include a single user interface, multiple user interfaces, a single user interface element, and/or multiple user interface elements. In some implementations, an interface layer may permit user interaction with another interface layer displayed underneath the interface layer, as described elsewhere herein.

In some implementations, user device 210 may provide the multiple interface layers for display via a single screen (e.g., rather than providing a sequence of screens, one at a time, that include multiple user interfaces and/or multiple user interface elements). For example, user device 210 may provide, for concurrent display, a first interface layer that includes a first user interface and a second interface layer that includes a second user interface rather than separately providing the first user interface for display via a first screen, ceasing to provide the first user interface based on a user interaction with the display of user device 210, and providing the second user interface for display via a second screen.

In this way, user device 210 may provide multiple user interfaces for display, via a single screen and in a z direction, rather than providing the multiple user interfaces for display via multiple screens, thereby reducing a quantity of screens that user device 210 uses to provide the multiple user interfaces and/or multiple user interface elements for display. This conserves memory and/or processor resources that would otherwise have been used to provide the multiple user interfaces for display via the multiple screens.

As further shown in FIG. 4, process 400 may include displaying, via a display of a user device, the user interfaces and/or the user interface elements in a manner that permits user interaction with multiple layers of the user interfaces and/or the user interface elements (block 420). For example, a display of user device 210 may display an interface layer of the multiple layers provided for display. In some implementations, user device 210 may display the multiple interface layers such that a user may interact with more than one interface layer by interacting with the display of user device 210 and without having to separately navigate to different interface layers.

In some implementations, the display of user device 210 may display a single interface layer. For example, the display may display an interface layer that obscures other interface layers provided for display (e.g., by displaying the interface layer as a top layer visible to a user of user device 210). Conversely, in some implementations, the display may display multiple interface layers. For example, the display may display a first interface layer (e.g., a top interface layer) and a second interface layer (e.g., an interface layer underneath the top interface layer), where the first interface layer obscures a portion of the second interface layer (e.g., rather than completely obscuring the second interface layer). As another example, the display may display a first interface layer, a second interface layer (e.g., an interface layer underneath the first interface layer), and a third interface layer (e.g., an interface layer underneath the second interface layer), and so forth, where at least a portion of each interface layer underneath the first interface layer is at least partially visible while the first interface layer is displayed.

In some implementations, the display may display the multiple interface layers in a manner that permits user interaction with an interface layer, of the multiple interface layers, beneath a top layer of the multiple interface layers (e.g., based on a portion of the top layer being transparent). For example, the display may display the multiple interface layers in a manner that permits physical user interaction (e.g., a touch gesture, such as a tap, a double-tap, a tap and hold, a nudge, a pinch, a spread, a slide, a drag, a flick, or a swipe) with the interface layer beneath the top layer. In some implementations, the display may display the multiple interface layers in a manner that permits interaction with a single interface layer. For example, when the display displays a single interface layer, user device 210 may permit user interaction with that single interface layer.

In some implementations, the display may display the interface layers in a manner that permits interaction with multiple interface layers. For example, when the display concurrently displays multiple interface layers, user device 210 may permit user interaction with any one of the multiple displayed interface layers. Continuing with the multiple interface layers example, user device 210 may permit interaction with the multiple interface layers by permitting user interaction with a first interface layer (e.g., a top interface layer) and by permitting user interaction with an un-obscured portion of a second interface layer (e.g., an interface layer underneath the top interface layer).

In some implementations, when user device 210 permits interaction with multiple interface layers, user device 210 may permit the user to interact with an interface layer underneath the top interface layer without interacting with the top interface layer. For example, user device 210 may permit the user to interact with a first interface layer displayed on top of a second interface layer or may permit the user to interact with the second interface layer without interacting with the first interface layer. In some implementations, user device 210 may identify a particular user interaction as a user interaction associated with a particular interface layer of the multiple interface layers. For example, user device 210 may identify a double tap as a double tap on the first layer. As another example, user device 210 may identify a triple tap as a double tap on the second layer underneath the first layer. This enables the user to interact with multiple interface layers vertically in a z direction via a single screen.

As further shown in FIG. 4, process 400 may include detecting a user interaction with an interface layer displayed via the display (block 430). For example, user device 210 may detect that a user has touched or is touching a portion of a touch screen display of user device 210. As another example, user device 210 may detect that a user has interacted with a portion of the display based on movement of a cursor associated with a user input device (e.g., a mouse or a pointer). In some implementations, user device 210 may detect that the user has interacted with an interface layer, or a portion of an interface layer, displayed via the display of user device 210. For example, user device 210 may detect that the user has interacted with a user interface or a user interface element associated with an interface layer by, for example, selecting a button displayed by the display of user device 210, selecting an icon displayed by the display of user device 210, or selecting a link displayed by the display of user device 210.

As further shown in FIG. 4, process 400 may include adjusting the manner in which the interface layers are displayed based on the user interaction (block 440). For example, user device 210 may adjust which interface layers are displayed via the display of user device 210. As another example, user device 210 may adjust an appearance of interface layers that are displayed. In some implementations, user device 210 may adjust the manner in which the interface layers are displayed based on the user interaction. For example, user device 210 may adjust the manner in which the interface layers are displayed based on the user navigating between the multiple interface layers.

In some implementations, user device 210 may adjust which interface layers are displayed. For example, user device 210 may obscure, or partially obscure, a previously un-obscured interface layer. As another example, user device 210 may un-obscure, or partially un-obscure, a previously obscured layer. Additionally, or alternatively, user device 210 may adjust an appearance of displayed interface layers. For example, user device 210 may shade or darken an interface layer, or a portion thereof, when the interface layer becomes partially obscured by another interface layer.

In some implementations, when adjusting the appearance of the displayed interface layers, user device 210 may replace a user interface, associated with an interface layer, with a user interface element, such as an icon, selection of which may cause user device 210 to display the replaced user interface or display an obscured interface layer. For example, user device 210 may provide a user interface element for display on top of other interface layers, selection of which may cause user device 210 to provide an obscured interface layer for display via a single selection (e.g., a single user interaction or a single touch). In this way, user device 210 may use transformational user interfaces and/or transformational user interface elements to enable a user to navigate between user interfaces via a single selection. This reduces or eliminates the need for user device 210 to provide multiple screens when a user is navigating to a previously displayed user interface, thereby conserving computing resources that would have been used to provide the multiple screens.

In some implementations, user device 210 may use animation to show adjustments to the manner in which the interface layers are displayed (e.g., to show transformations to user interfaces and/or user interface elements). For example, user device 210 may use animation to show that a user interface associated with an interface layer has transformed to an icon and can be viewed by selecting the icon (e.g., by using animation to show the user interface collapsing into the icon and moving to a particular portion of the display). Conversely, as another example, user device 210 may use animation to show a user interface expanding from an icon, and to show the appearance of another icon, such as a close icon, selection of which may collapse (e.g., transform) the user interface into the icon.

As another example, user device 210 may use animation to show a user interface associated with an interface layer appearing from an edge or a corner of the display of user device 210. For example, user device 210 may use animation to show a user interface appearing from a top edge of the display and moving toward a bottom edge, appearing from a right edge and moving toward a left edge, appearing from a bottom left corner and moving toward a top right corner, etc. Using animation to show adjustments to the manner in which the multiple interface layers are displayed enables a user of user device 210 to visually track adjustments to the manner in which the multiple interface layers are displayed (e.g., by tracking a hierarchy of location or a path of the interface layers). This enables the user to easily and quickly navigate between multiple interface layers, thereby conserving computing resources by reducing or eliminating excess navigation by the user.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
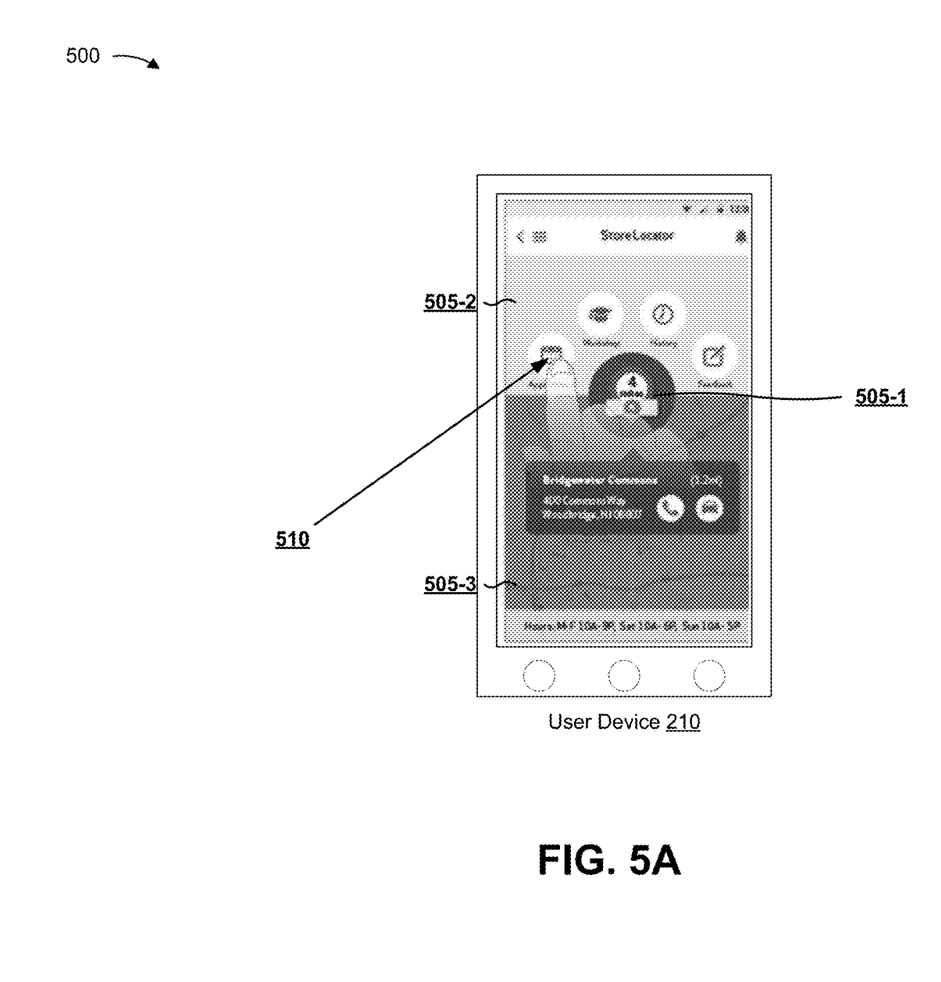
FIGS. 5A-5C are diagrams of an example implementation relating to the example process shown in FIG. 4.
Figure 5B:
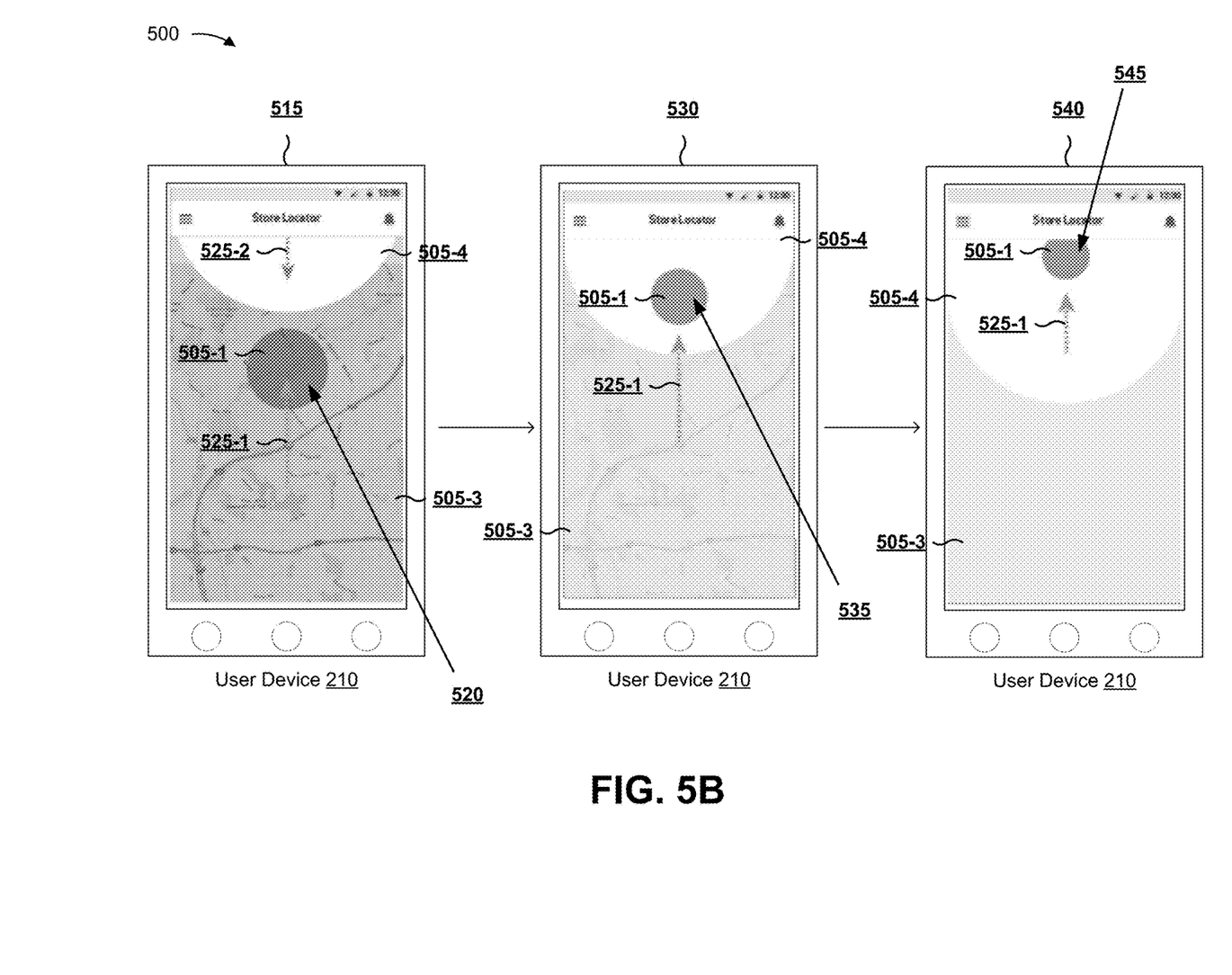
Figure 5C:
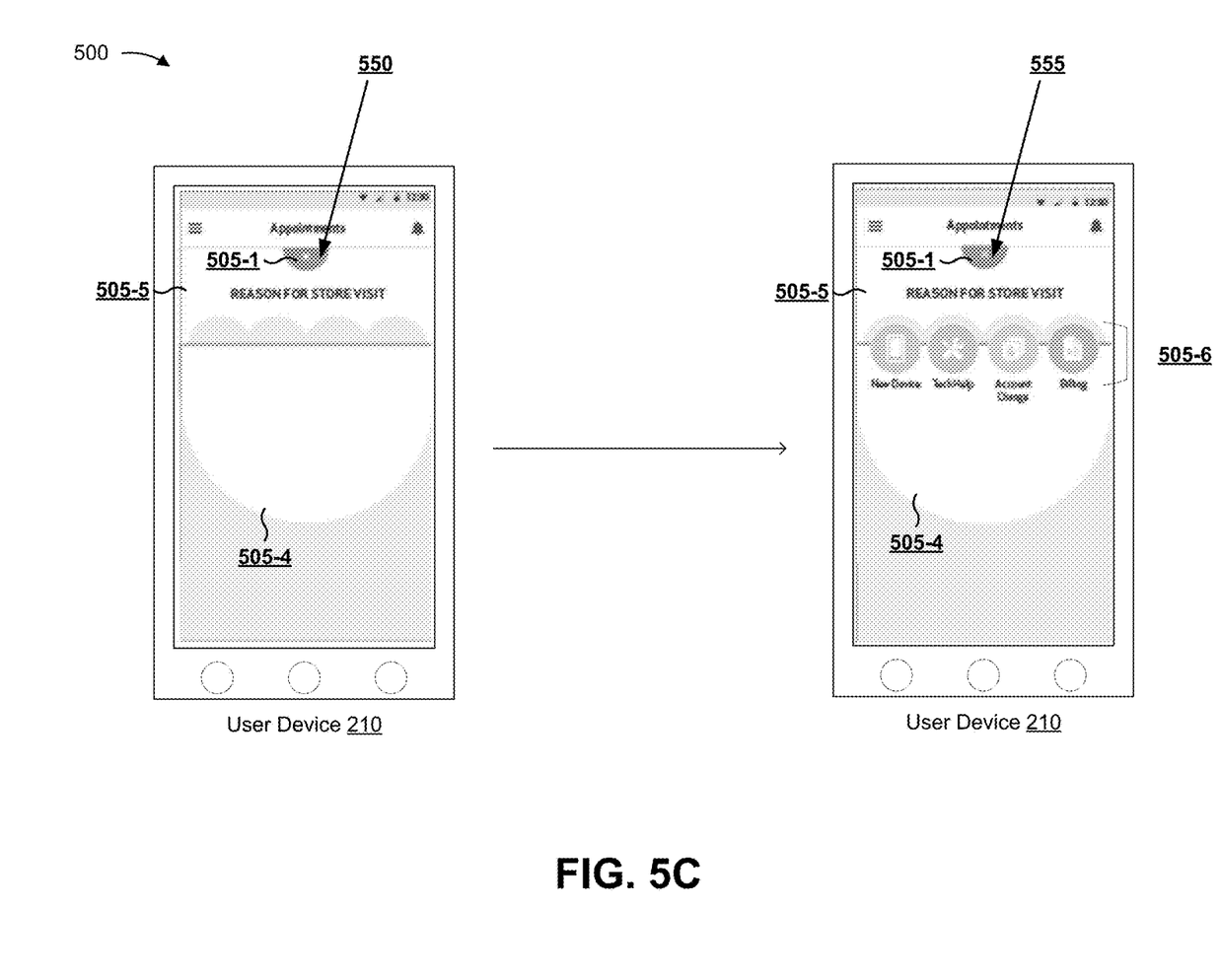

FIGS. 5A-5C are diagrams of example implementation 500 relating to the example process shown in FIG. 4.

As shown in FIG. 5A, user device 210 may display interface layers 505-1 through 505-3. Assume for FIGS. 5A through 5C that interface layers 505-1 through 505-3 are different interface layers and are associated with a single application (e.g., an application installed on user device 210, an application executing on user device 210, or an application executed remotely by user device 210). Further assume, for example, that interface layer 505-1 includes multiple circular user interface elements on top of interface layer 505-2 and 505-3, interface layer 505-2 includes a single color opaque background on top of interface layer 505-3, and interface layer 505-3 includes a shaded image of a map. As shown by reference number 510, a user may interact with interface layer 505-1 by selecting an icon of a user interface associated with interface layer 505-1.

As shown in FIG. 5B, and by reference number 515, user device 210 has adjusted the manner in which interface layers 505-1 through 505-3 are displayed. As shown by reference number 520, user device 210 has adjusted the manner in which interface layer 505-1 is displayed by transforming the user interface associated with interface layer 505-1 into a circle icon (e.g., a container of the user interface). User device 210 may use animation to show the user interface collapsing into the circle icon. In addition, as further shown in FIG. 5B, user device 210 has adjusted the manner in which interface layer 505-3 is displayed by reducing shading of interface layer 505-3. Further, user device 210 has obscured interface layer 505-2.

As indicated by the arrow shown by reference number 525-1, user device 210 may use animation to show interface layer 505-1 moving toward a top portion of the display of user device 210. As further shown in FIG. 5B, user device 210 may adjust the manner in which interface layer 505-4 is displayed by un-obscuring interface layer 505-4. As indicated by the arrow shown by reference number 525-2, user device 210 may use animation to show interface layer 505-4 appearing from a top portion of the display associated with user device 210 and moving toward a bottom portion of the display.

As further shown in FIG. 5B, and by reference numbers 530 and 540, user device 210 may continue to adjust the manner in which interface layers are displayed via the display of user device 210. As shown by reference numbers 535 and 545, user device 210 may continue to use animation to show interface layer 505-1 collapsing into a circle icon and moving toward the top portion of the display. In addition, user device 210 may use animation to show interface layer 505-4 continuing to move toward a bottom portion of the display. Further, user device 210 may use animation to adjust the appearance of interface layer 505-3 from a shaded image of a map to a single color opaque background.

As shown in FIG. 5C, and by reference number 550, interface layer 505-1 has ceased moving toward the top portion of the display and interface layer 505-4 has ceased moving toward the bottom portion of the display. As further shown in FIG. 5C, user device 210 may un-obscure interface layers 505-5 and 505-6. As shown by reference number 555, interface layer 505-1 has transformed into an icon (e.g., a close icon with an "x" symbol), selection of which may cause user device 210 to display interface layers in the manner shown in FIG. 5A (e.g., via a single selection), thereby enabling a user to return to previously displayed interface layers without using a back button and without changing screens. This conserves computing resources of user device 210 by reducing or eliminating the need for user device 210 to provide a sequence of screens to return the user to a previously displayed interface layer. In addition, the independent nature of the multiple interface layers reduces or eliminates the need for user device 210 to allocate computing and/or memory resources to cache or preserve multiple complete screens, which are not visible to the user and are cached or preserved for the event that the user selects a back button or a forward button, thereby conserving computing and/or memory resources of user device 210.

As indicated above, FIGS. 5A-5C are provided merely as an example. Other examples are possible and may differ from what was described with regard to FIGS. 5A-5C.

Figure 6A:
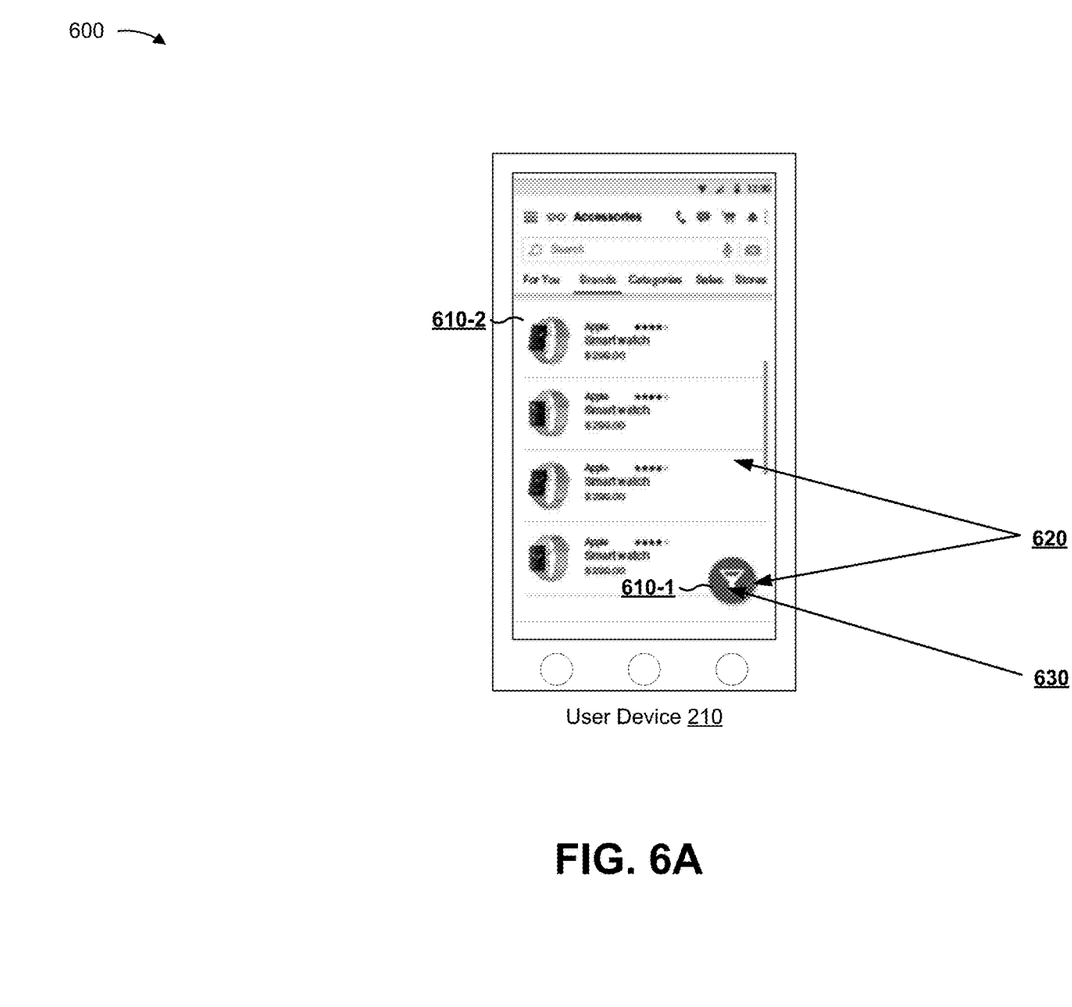
FIGS. 6A-6C are diagrams of an example implementation relating to the example process shown in FIG. 4.
Figure 6B:
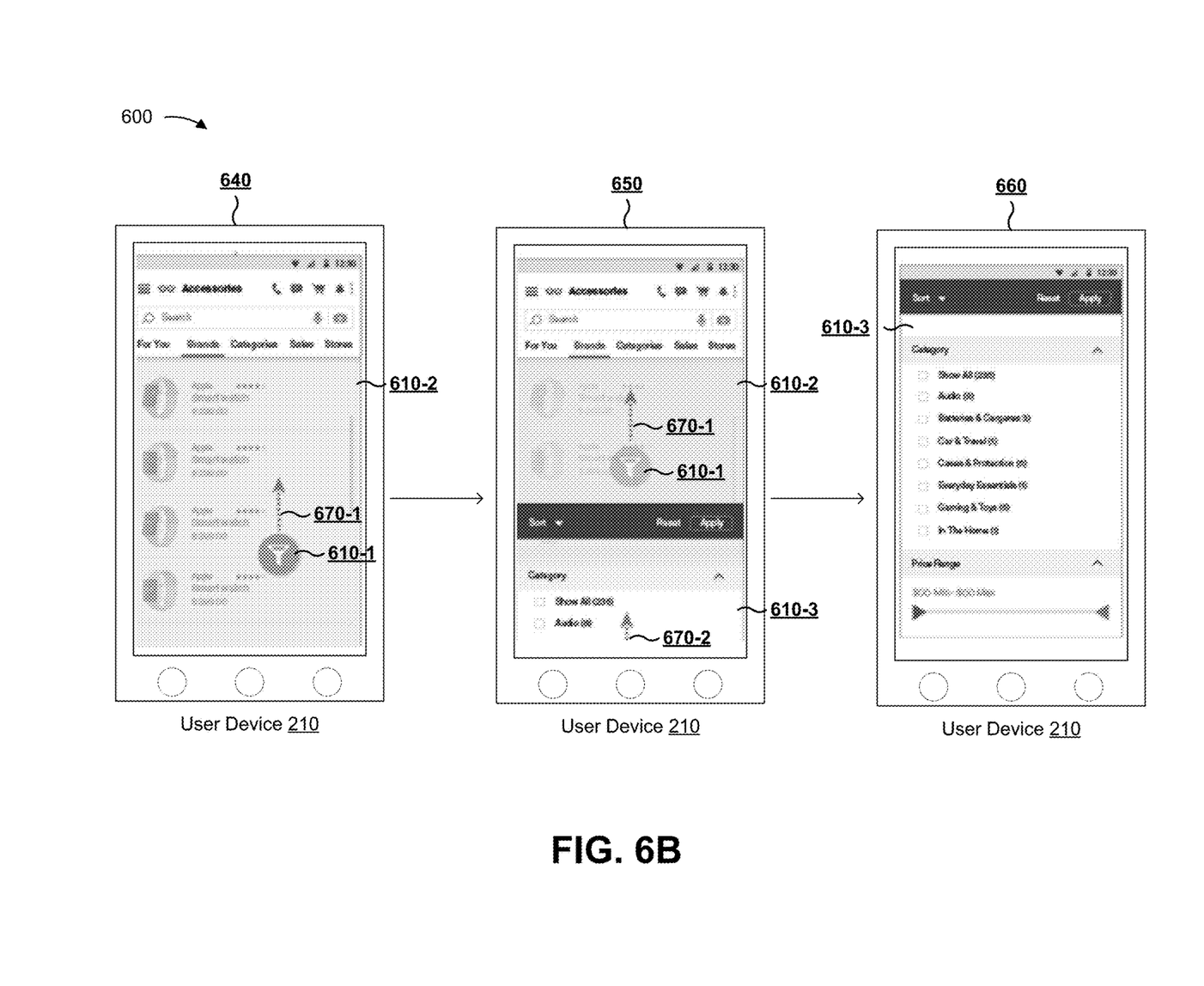
Figure 6C:
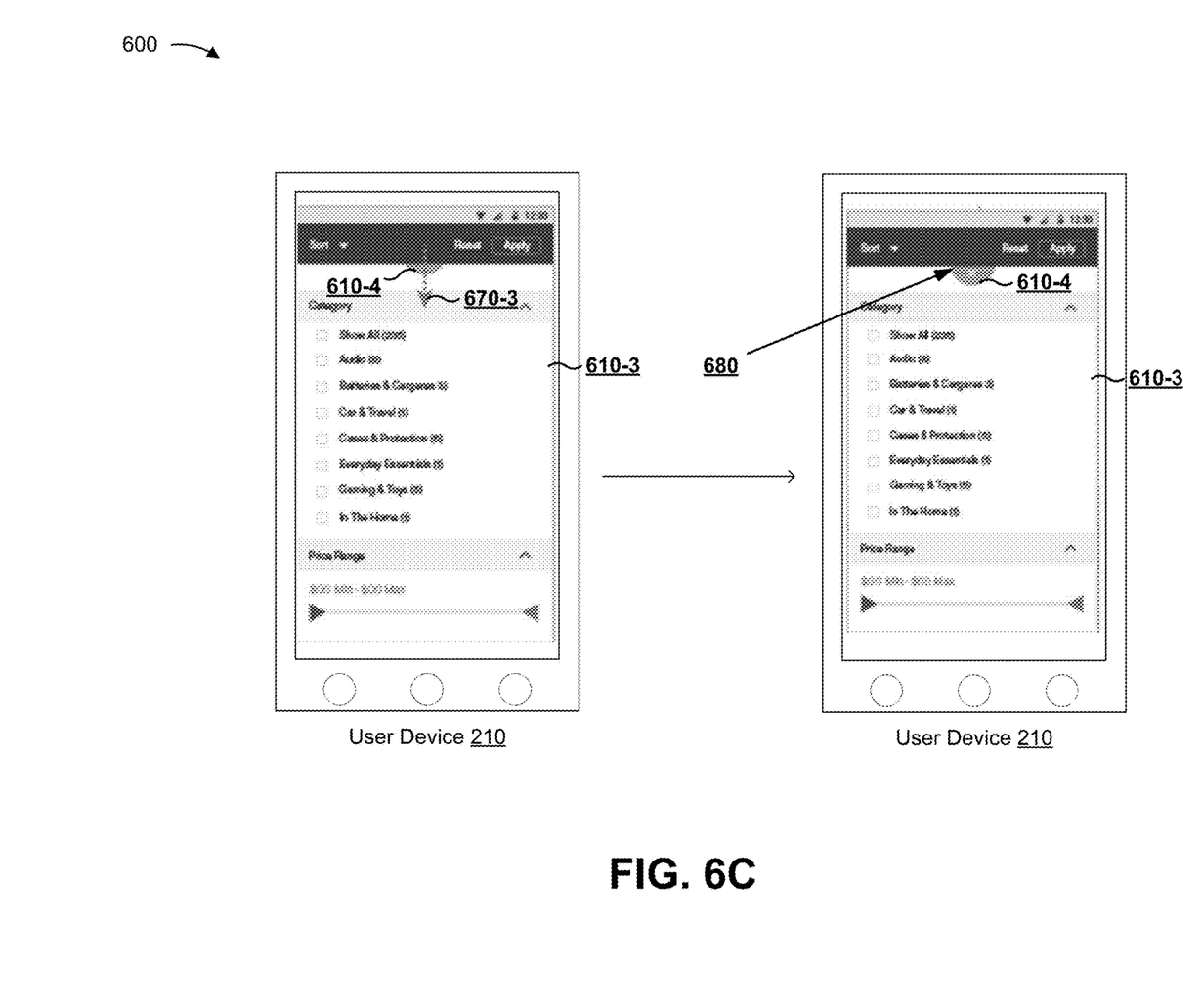

FIGS. 6A-6C are diagrams of example implementation 600 relating to the example process shown in FIG. 4.

As shown in FIG. 6A, a display of user device 210 may display multiple interface layers 610-1 (e.g., a filter icon) and 610-2 (e.g., a user interface) associated with a single application. As shown by reference number 620, a user may be permitted to interact with either interface layer 610-1 (e.g., by being permitted to interact with the filter icon) or 610-2 (e.g., by being permitted to interact with the user interface) without interacting with the other interface layer. As shown by reference number 630, assume for FIGS. 6A-6C that a user interacts with interface layer 610-1 by interacting with the filter icon (e.g., by selecting the filter icon). Assume for FIGS. 6A through 6C that interface layer 610-1 visually represents an obscured interface layer associated with the application.

As shown in FIG. 6B, and by reference numbers 640 through 660, user device 210 may adjust the manner in which the interface elements are displayed via the display of user device 210 based on the user interaction. As shown by reference number 670-1, user device 210 may use animation to show interface layer 610-1 moving from a bottom portion of the display toward a top portion of the display (as indicated by the arrow associated with reference number 670-1). In addition, user device 210 may cause interface layers 610-1 and 610-2 to begin to fade out (e.g., become transparent). As shown by reference number 670-2, user device 210 may use animation to show interface layer 610-3 appearing from a bottom portion of the display and moving toward a top portion of the display (as indicated by the arrow associated with reference number 670-2). As shown by reference number 660, user device 210 may fully display interface layer 610-3 (e.g., by completely fading out interface layers 610-1 and 610-2 and layering interface layer 610-3 on top of interface layers 610-1 and 610-2).

As shown in FIG. 6C, and as indicated by the arrow associated with reference number 670-3, user device 210 may use animation to show interface layer 610-4 appearing from a top portion of the display and moving toward a bottom portion of the display. As shown by reference number 680, interface layer 610-4 may be displayed in a top portion of the display and interface layer 610-4 may be displayed on top of interface layer 610-3, such that a user may interact with interface layer 610-3 or with interface layer 610-4, thereby enabling the user to interact with multiple interface layers in a z direction. In addition, interface layer 610-4 may be displayed to represent interface layer 610-1, thereby indicating a transformation of interface layer 610-1 to interface layer 610-4 (e.g., transformation from a filter icon to a close button). User selection of interface layer 610-4 may cause user device 210 to display interface layers in the same manner as shown in FIG. 6A (e.g., via a single selection), thereby enabling the user to navigate between multiple layers of user interfaces without using a back button or a forward button and without using multiple screens.

As indicated above, FIGS. 6A-6C are provided merely as an example. Other examples are possible and may differ from what was described with regard to FIGS. 6A-6C.

Implementations described herein enable a user to navigate between multiple interface layers using a single screen (e.g., rather than using multiple screens as would be the case with linear navigation). This conserves computing resources associated with providing multiple screens in order to return the user to a previously displayed interface layer. In addition, this conserves computing resources and improves a user experience by reducing a quantity screens displayed to the user when navigating between the multiple interface layers.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, to:
provide multiple user interface layers for display in a layered manner where at least one user interface layer, of the multiple user interface layers, partially obscures at least one other user interface layer, of the multiple user interface layers,
the multiple user interface layers being associated with a single application;
display, via a single screen of a display of the device, the multiple user interface layers in a manner that permits user interactions with the multiple user interface layers,
a first user interface layer, of the multiple user interface layers, being displayed on top of a second user interface layer, of the multiple user interface layers, to permit user interaction with the second user interface layer without interaction with the first user interface layer via the single screen of the display;
detect a user interaction with the first user interface layer displayed via the display;
adjust the manner in which the multiple user interface layers are displayed based on the user interaction with the first user interface layer,
the first user interface layer being transformed into a single user interface element when the user interaction is detected with the first user interface layer,
the second user interface layer being transformed when the user interaction is detected with the first user interface layer, and
where the one or more processors, when adjusting the manner in which the multiple user interface layers are displayed, are to:
obscure the first user interface layer; and
display the single user interface element as a top user interface layer,
the single user interface element visually representing the first user interface layer and causing the device to display the first user interface layer based on a single user interaction with the single user interface element; and
undo multiple adjustments to the manner in which the multiple user interface layers are displayed based on a single user interaction.

2. The device of claim 1, where the one or more processors are further to:
use animation to show adjustments to the manner in which the multiple user interface layers are displayed.

3. The device of claim 1, where the one or more processors, when adjusting the manner in which the multiple user interface layers are displayed, are to:
adjust which of the multiple user interface layers are displayed, or
adjust an appearance of the multiple user interface layers.

4. The device of claim 1,
where the one or more processors, when adjusting the manner in which the multiple user interface layers are displayed, are to:
display multiple adjusted user interface layers within the single screen of the display.

5. A non-transitory computer-readable medium storing instructions, the instructions comprising:
one or more instructions that, when executed by one or more processors, cause the one or more processors to:
provide a plurality of user interface layers for display,
the plurality of user interface layers being provided for display where at least one user interface layer, of the plurality of user interface layers, at least partially obscures at least one other user interface layer, of the plurality of user interface layers,
the plurality of user interface layers being associated with a single application;
display, via a display of a device, the plurality of user interface layers in a manner that permits user interactions with more than one user interface layer, of the plurality of user interface layers, via a single screen of the display,
a first user interface layer, of the plurality of user interface layers, being displayed in a manner to permit user interaction with a second user interface layer, of the plurality of user interface layers, without interaction with the first user interface layer via the single screen of the display;
detect a user interaction with the first user interface layer displayed via the display;
adjust the manner in which the plurality of user interface layers are displayed based on the user interaction with the first user interface layer, the first user interface layer being transformed into a single user interface element when the user interaction is detected with the first user interface layer,
the second user interface layer being transformed when the user interaction is detected with the first user interface layer, and
where the one or more instructions, that cause the one or more processors to adjust the manner in which the plurality of user interface layers are displayed, cause the one or more processors to:
obscure the first user interface layer; and
display the single user interface element as a top user interface layer,
the single user interface element visually representing the first user interface layer and causing the device to display the first user interface layer based on a single user interaction with the single user interface element; and
undo multiple adjustments to the manner in which the plurality of user interface layers are displayed based on a single user interaction.

6. The non-transitory computer-readable medium of claim 5, where the one or more instructions, that cause the one or more processors to adjust the manner in which the plurality of user interface layers are displayed, cause the one or more processors to:
display a plurality of adjusted user interface layers within the single screen of the display.

7. The non-transitory computer-readable medium of claim 5, where
the second user interface layer is positioned underneath the first user interface layer.

8. The non-transitory computer-readable medium of claim 5, where the one or more instructions, that cause the one or more processors to transform the first user interface layer, cause the one or more processors to:
use animation to show the first user interface layer transforming from the first user interface layer to the single user interface element.

9. A method, comprising:
providing, by a device, multiple user interface layers for display in a layered manner,
the multiple user interface layers being associated with a single application,
the multiple user interface layers being layered such that at least one user interface layer, of the multiple user interface layers, at least partially obscures at least one other user interface layer, of the multiple user interface layers;
displaying, by the device and via a single screen of the display of the device, the multiple user interface layers in a manner that permits user interactions with more than one user interface layer, of the multiple user interface layers, via a single screen of the display,
a first user interface layer, of the multiple user interface layers, being displayed in a manner to permit user interaction with a second user interface layer, of the plurality of user interface layers, without interaction with the first user interface layer via the single screen of the display;
detecting, by the device, a user interaction with the first user interface layer displayed via the display;
adjusting, by the device, the manner in which the multiple user interface layers are displayed based on the user interaction with the first user interface layer,
the first user interface layer being transformed into a single user interface element when the user interaction is detected with the first user interface layer,
the second user interface layer being transformed when the user interaction is detected with the first user interface layer, and
where adjusting the manner in which the multiple user interface layers are displayed comprises:
obscuring the first user interface layer; and
displaying the single user interface element as a top user interface layer,
the single user interface element visually representing the first user interface layer and causing the device to display the first user interface layer based on a single user interaction with the single user interface element; and
undoing, by the device, multiple adjustments to the manner in which the multiple user interface layers are displayed based on a single user interaction.

10. The method of claim 9, where the user interaction with the first user interface layer indicates interaction with the first user interface layer underneath the second user interface layer.

11. The method of claim 9, where adjusting the manner in which the multiple user interface layers are displayed comprises:
adjusting which user interface layers, of the multiple user interface layers, are obscured or un-obscured.

12. The method of claim 9, where adjusting the manner in which the multiple user interface layers are displayed comprises:
adjusting an appearance of user interface layers-s.

13. The device of claim 1, where the one or more processors are further to:
identify a user interaction as being associated with a particular user interface layer of the multiple user interface layers.

14. The non-transitory computer-readable medium of claim 5, where the one or more instructions, when executed by the one or more processors, further cause the one or more processors to:
identify a user interaction as associated with a particular user interface layer of the plurality of user interface layers.

15. The non-transitory computer-readable medium of claim 5, where the one or more instructions, when executed by the one or more processors, further cause the one or more processors to:
use animation to show adjustments to the manner in which the plurality of user interface layers are displayed.

16. The non-transitory computer-readable medium of claim 5, where the one or more instructions, that cause the one or more processors to adjust the manner in which the plurality of user interface layers are displayed, cause the one or more processors to:
display a plurality of adjusted user interface layers within the single screen of the display.

17. The non-transitory computer-readable medium of claim 5, where the one or more instructions, that cause the one or more processors to adjust the manner in which the plurality of user interface layers are displayed, cause the one or more processors to:
adjust which of the plurality of user interface layers are displayed, or
adjust an appearance of the plurality of user interface layers.

18. The method of claim 9, further comprising:
identifying a user interaction as associated with a particular user interface layer of the multiple user interface layers; and
adjusting the particular user interface layer based upon the user interaction.

19. The method of claim 9, further comprising:
adjusting which of the multiple user interface layers are displayed, or
adjusting an appearance of the multiple user interface layers.

20. The non-transitory computer-readable medium of claim 5, where the one or more instructions, that cause the one or more processors to adjust the manner in which the plurality of user interface layers are displayed, cause the one or more processors to:
adjust an appearance of user interface layers.

\* \* \* \* \*